United States Patent [19]

Liverant et al.

[11] 4,120,855

[45] Oct. 17, 1978

[54] BACTERICIDALLY ACTIVE MONOCHLOROTRIAZINE DYES

[76] Inventors: Vladimir Leibovich Liverant, ulitsa Lenina, 50, kv. 15; Lev Moiseevich Yagupolsky, ulitsa I.Kudri, 41, kv. 48; Andrei Yakovlevich Ilichenko, ulitsa I.Kudri, 39, kv. 45; Faina Borisovna Timashpolskaya, ulitsa Miljutenko, 11/1, kv. 106; Elena Alexeevna Fedorovskaya, ulitsa Yakira, 16/8, korpus 2, kv. 29; Lidia Ivanovna Petrik, Vozdukhoflotsky prospekt, 52, kv. 139, all of Kiev; Iosif Yakubovich Kalantarov, ulitsa Kuibysheva, 4/1, kv. 15, Dushanbe; Mira Semenovna Kopylova, ulitsa Patorzhinskogo, 16, kv. 4, Kiev; Idima Evgenievna Meitus, ulitsa Putovskogo, 69, kv. 26, Dushanbe, all of U.S.S.R.

[21] Appl. No.: 733,369

[22] Filed: Oct. 18, 1976

[51] Int. Cl.$^2$ .................... C09B 62/06; C09B 62/08; C09B 62/10; A61L 1/00

[52] U.S. Cl. .................................. 260/153; 424/226; 424/249; 544/181; 544/187; 544/204

[58] Field of Search ................. 260/153, 242, 248 NS, 260/249.8, 249.5; 424/226, 249; 544/181, 187, 204

[56] References Cited

U.S. PATENT DOCUMENTS

| | | | |
|---|---|---|---|
| 3,259,618 | 7/1966 | Andrew | 260/146 T |
| 3,354,140 | 11/1967 | Benz et al. | 260/146 T |
| 3,663,526 | 5/1972 | Oesterlein et al. | 260/153 |
| 3,709,869 | 1/1973 | Mazza | 260/153 |

FOREIGN PATENT DOCUMENTS 43-16,391  10/1968  Japan .................... 424/249

*Primary Examiner*—Floyd D. Higel
*Attorney, Agent, or Firm*—Lackenbach, Lilling & Siegel

[57] ABSTRACT

A method and composition for producing a bactericidal active monochlorotriazine dye, by reacting active dichlorotriazine dye with a bactericidal compound containing hydroxyl or amino groups. The reaction is run in an aqueous, organic, or water-organic medium at 20°–40° C. The monochlorotriazine dye thus formed is active and possesses bactericidal properties. On dyeing fibres, it endows them with high bactericidal properties retained after repeated wet treatments.

5 Claims, No Drawings

BACTERICIDALLY ACTIVE MONOCHLOROTRIAZINE DYES

The present invention relates to bactericidal dyes and more particularly to a method and composition for producing bactericidal active monochlorotriazine dye. Bactericidal dyes are used for dyeing fibres and articles made from them to impart bactericidal properties to fibrous material which is necessary for protecting the material from decomposition under the action of moisture. Fibrous materials possessing bactericidal properties are essential for active protection of man from pathogenic microorganisms.

One of the routes to solving this technological problem is dyeing fibres and fibrous materials with dyes possessing bactericidal properties, for example, triphenylmethane derivatives, chromium or copper-containing dyes. However, the bactericidal effect imparted by these dyes to fibrous material is small and vanishes even after a short period of service.

A more stable bactericidal effect is obtained upon dyeing fibrous materials with active dyes, for example, dichlorotriazine with subsequent treatment of the materials with bactericidal preparations (French Pat. No. 1,499,788, Class A61 1 13/00 DO6p I/88).

According to the method described in said Patent, an active dye applied to polyamide knitted goods is treated with 0.1% HCl solution at room temperature for 20 minutes. Then the acid is washed off with distilled water to neutral reaction and the dye is treated for 60 minutes at 20° C with 0.1% AgNO$_3$ solution. After that the material is washed and dried.

The above method has a number of essential disadvantages. Firstly, the introduction of bactericidal AgNO$_3$ into the structure of the dye applied to the fibre requires additional operations, which complicates the technological process and makes it more expensive.

Secondly, the treatment of articles made from polyamide fibres with an acid lowers their strength and, consequently, diminishes their service life.

It is an object and composition for the invention to provide a method of producing active monochlorotriazine dyes which will contain bactericidal compounds and impart bactericidal properties to the fibrous materials upon dyeing.

This object is accomplished in a method and composition for producing a bactericidal active monochlorotriazine dye, which, according to the invention, resides in reacting an active dichlorotriazine dye with a bactericidal compound containing hydroxyl or amino groups at 20°-40° C in an aqueous, organic, or water-organic medium.

According to the invention, as a bactericidal compound containing hydroxyl groups, use can be made of phenol halogen-derivatives, for example, hexachlorophene (2,2'-dihydroxy-3,3',5,5',6,6'-hexachlorodiphenylmethane), 2,2'-dihydroxy-5,5'-dichlorodiphenylmethane, antibiotics, for example, levomycetin, D-(-)-treo-I-(p-nitrophenol)-2-dichloroacetylamino-1,3-propanediol, and compounds containing an NH$_2$-group such as sulphamides can be used, for example, white soluble streptocide (sodium salt of p-aminobenzenesulphamide), soluble albucide (sodium salt of sulphacetamide).

The following versions of realizing the present invention are possible.

The interaction of dichlorotriazine dye with a bactericidal compound containing OH-groups is run in an aqueous medium at pH 7-9 and at 20° C. The bactericidal active monochlorotriazine dye thus formed is separated by salting out, for example, by adding excess NaCl.

The interaction of dichlorotriazine dye with said bactericidal compound containing NH$_2$-groups can also be conducted in an aqueous medium but at pH 5.6-6.2 and at 30°-40° C. The bactericidal active monochlorotriazine dye obtained is separated by salting out.

Another version of realizing the invention is possible, consisting in that the interaction between said components, i.e. dye and bactericide, is run in a medium of an organic solvent. Use can be made of any organic solvent which dissolves well enough both the dye and bactericide. In this case the bactericidal active monochlorotriazine dye is isolated by reprecipitation from another solvent in which the product is insoluble. It is more preferable to run the reaction in an organic solvent since possible hydrolysis of the initial dichlorotriazine dye is prevented, and increases the yield of the desired product. The interaction of the initial active dichlorotriazine dye with said bactericidal compounds proceeds via substitution of the chlorine atom in the triazine ring according to the scheme

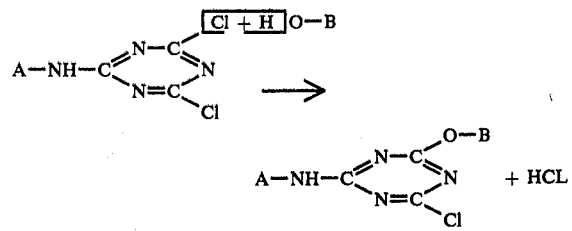

where A is the chromophoric part of the dichlorotriazine dye, HO—B is the bactericidal compound.

As can be seen from the scheme, the bactericidal compound is chemically bound with the dye.

As was mentioned above, the interaction is conducted within the temperature range from 20-40° C, otherwise the desired result is not attained. If the reaction is conducted at a temperature above 40° C, two chlorine atoms are substituted in the triazine ring of the dye which results in the loss of its activity. Below 20° C the reaction rate drastically lowers.

The reaction between said components proceeds well at a ratio found from stoichiometry. But it goes even more effectively when the initial dye is taken in excess, which increases the yield of the desired product.

The dyes obtained by the method proposed in the invention can be used for dyeing both natural and man-made fibres and articles from them. The technological process of dyeing with the proposed bactericidal dyes is similar to that used for conventional monochlorotriazine dyes.

The present invention has the following advantages.

The herein-proposed method and composition for producing bactericidal active monochlorotriazine dye is technologically simple and can easily be realized under industrial conditions. Said bactericidal dye can be obtained by following the scheme of producing monochlorotriazine dyes.

The proposed dyes endow the fibres and fibrous material with high bactericidal properties retained after repeated (30 and more) wet treatments and prolonged service. The invention makes it possible to control the bactericidal activity of the proposed dyes, choosing appropriate bactericidal compounds depending on pathogenic microorganisms against which the fibrous material is used.

The process of dyeing fibrous material with bactericidal active monochlorotriazine dyes does not require special equipment and can be performed at any dyeing and finishing plant.

The proposed bactericidal dyes can find wide application for imparting bactericidal properties to stockings and socks, shoe cloth, filters, and clothes for medical personnel.

At present, the industry is not provided with active dyes possessing bactericidal properties and the present invention may, therefore, be of great commercial interest.

For a better understanding of the present invention specific examples of its realization are given hereinbelow by way of illustration.

EXAMPLE 1

Starting Components

Dichlorotriazine dye of formula (1)

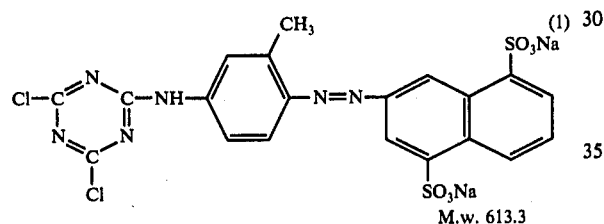

M.w. 613.3

Bactericidal compound, hexachlorophene, of formula (2)

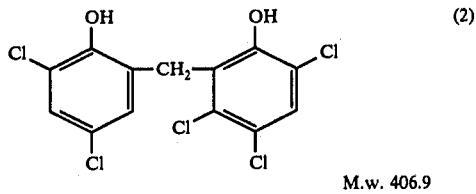

M.w. 406.9

5 g of the dye are dissolved in 60 ml of dimethylformamide and 3 g of hexachlorophene are added into the resulting solution. The solution is heated up to the temperature range 35°–40° C and the reaction is run for 3–5 hours under continuous stirring. On completion of the reaction, the solution is cooled down to room temperature and the dye obtained is precipitated with methyl-ethyl ether. The precipitate is separated and washed with methyl-ethyl ether up to complete removal of the unreacted hexachlorophene. The dye is dried at 40°–50° C. The product obtained is yellow in color.

The yield is 70% of theory.

EXAMPLE 2

Starting Components

Dichlorotriazine dye of formula (3)

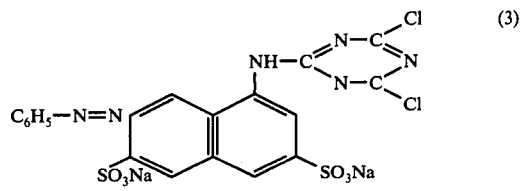

Bactericidal compound of formula (2) as in Example 1

4 g of hexachlorophene are dissolved in 300 ml of water-acetone mixture (1:1 acetone-to-water ratio). The solution obtained is poured to 500 ml of 3% solution of the dye in water (the dye being taken in excess), and soda is added gradually up to pH 9.0.

The reaction is run for 3 hours under continuous stirring at 20° C.

Then the solution is cooled down to 12°–17° C, and the dye obtained is salted out with sodium chloride. The precipitate is separated, and washed with 10% solution of NaCl and after that with ethylacetate up to complete removal of the unreacted hexachlorophene. The bactericidal monochlorotriazine dye obtained is dried at 40°–50° C. The product is red in color.

The yield is 30.2% of theory.

EXAMPLE 3

Starting Components

Dichlorotriazine dye of formula (1)

Bactericidal compound — levomycetin of the formula

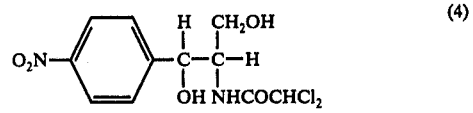

3.8 g of levomycetin are dissolved in 200 ml of water-alcohol mixture (1:1 ethanol-to-water ratio). The solution obtained is poured to 500ml of 3% aqueous solution of the dye, and soda is added gradually up to pH=8.5–9.0.

The reaction is run for 3 hours under continuous stirring at 20° C.

Then the solution is cooled down to 12°–17° and the dye obtained is salted out with sodium chloride. The precipitate is separated, washed with 10% solution of NaCl and after that with ethylacetate until the unreacted levomycetin is completely removed.

The bactericidal dye obtained is dried at 40°–50°.

The yield is 39.0% of theory.

EXAMPLE 4

Starting Components

Dichlorotriazine dye of formula (3) as in Example 2

Bactericidal compound of formula (4) as in Example 3

The reaction is conducted by following the procedure described in Example 3.

The yield of the desired product is 34.4% of theory.

EXAMPLE 5

Starting Components

Dichlorotriazine dye as in Example 1

Bactericidal compound — albucide of formula (5)

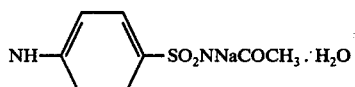

M.w. 254.24

5 g of the dye which is taken in excess are dissolved in 100 ml of water. 5 ml of 30% albucide solution are added to the solution obtained and pH is adjusted to 6.0. The solution is heated up to 40° C and the reaction is run for 3 hours under continuous stirring.

Then the solution is cooled down to 12°–17° C and the dye is salted out with sodium chloride. The precipitate is washed with 10% NaCl solution. The bactericidal monochlorotriazine dye produced is dried at 40–50° C. The yield is 57.7% of theory.

EXAMPLE 6

Starting Components

Dichlorotriazine dye as in Example 2.
Bactericidal compound as in Example 5.

The reaction is run by following the procedure described in Example 5.

The yield is 54.0% of theory.

EXAMPLE 7

Starting Components

The dye as in Example 1.

The bactericidal compound is white streptocide (soluble) of the formula

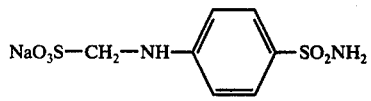

The reaction is run by following the procedure described in Example 5.

The yield is 51.1% of theory.

EXAMPLE 8

Starting Components

Dichlorotriazine dye of formula (7).

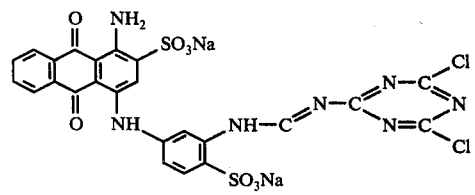

Bactericidal compound of formula (6) as in Example 7.

The reaction is run by following the procedure described in Example 5.

The yield is 52.0% of theory. The product is blue in color.

EXAMPLE 9

Starting Components

Dichlorotriazine dye of formula (3).
Bactericidal compound of formula (2).

The reaction is run by following the procedure described in Example 1. The product is red in color.

The yield is 74% of theory.

EXAMPLE 10

Starting Components

Dichlorotriazine dye of formula (7).
Bactericidal compound of formula (2).

The reaction is run by following the procedure described in Example 1. The product is blue in color.

The yield is 71.0% of theory.

The bactericidal active monochlorotriazine dyes are applied to fibrous material by padding-mangle or discontinuous method at a liquor ratio of 5–20. The samples of dyed material are washed 20–30 times in a solution of detergent at a concentration of 1 g/l at 50° C for 30 minutes.

The bactericidal activity of the dyed samples is tested by the agar-plate method, *Staphylococcus aureus* 209 being used as a test-culture. The samples of material dyed with bactericidal active dyes acquire high bactericidal activity retaining after 20–30 washings. The data on bactericidal activity of dyed cotton samples are given in the Table.

TABLE

| | Bactericidal Activity of Cottom Samples Dyed with Bactericidal Active Monochlorotriazine Dyes | | | | |
|---|---|---|---|---|---|
| | Diameter of growth inhibition zone of test-culture around the sample, mm | | | | |
| Bactericidal dye | before washing | after 5 washings | after 10 washings | after 20 washings | after 30 washings |
| As in Ex. 1 | 44 | 40 | 40 | 40 | 37 |
| As in Ex. 3 | 30 | — | 30 | — | 30 |
| As in Ex. 7 | 40 | — | 33 | 30 | — |
| As in Ex. 5 | 35 | — | 30 | 28 | — |

What is claimed is:

1. A bactericidally active monochlorotrizine dye compound having the formula:

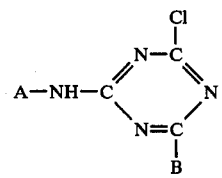

wherein A is chromophoric; and B is a bactericidal component selected from the group consisting of hydroxyl derivatives, antibiotics, and $NH_2$ derivatives.

2. The compound of claim 1, wherein said bactericidal component is derived from the group consisting of Na-salt of p-aminobenzenesulphamide, and Na-salt of sulphacetamide.

3. The compound of claim 1, wherein said bactericidal component is derived from an antibiotic selected from the group consisting of levomycetin, and D-(-)-treo-1-(p-nitrophenol)-2-dichloroacetyl-amino-1,3-propanediol.

4. The compound of claim 1, wherein said bactericidal component is derived from a phenol halogen selected from the group consisting of hexachlorophene (2,2'-dihydroxy-3,3',5,5',6,6'-hexachlorodiphenylmethane), and 2,2'-dihydroxy-5,5'-dichlorodiphenylmethane.

5. The compound of claim 4 wherein said bactericidal component is derived from 2,2'-dihydroxy-3,3',5,5',6,6'-hexachlorodiphenylmethane.

* * * * *